US008627083B2

(12) United States Patent
Qiu et al.

(10) Patent No.: US 8,627,083 B2
(45) Date of Patent: Jan. 7, 2014

(54) ONLINE SECURE DEVICE PROVISIONING WITH ONLINE DEVICE BINDING USING WHITELISTS

(75) Inventors: Xin Qiu, San Diego, CA (US); Alexander Medvinsky, San Diego, CA (US); Stuart P. Moskovics, San Diego, CA (US); Jason A. Pasion, San Diego, CA (US); Fan Wang, San Diego, CA (US); Ting Yao, San Diego, CA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/267,672

(22) Filed: Oct. 6, 2011

(65) Prior Publication Data

US 2012/0089839 A1    Apr. 12, 2012

Related U.S. Application Data

(60) Provisional application No. 61/390,387, filed on Oct. 6, 2010.

(51) Int. Cl.
*H04L 9/32* (2006.01)

(52) U.S. Cl.
USPC .......................................... 713/171; 726/28

(58) Field of Classification Search
USPC ................................................... 713/71, 171
See application file for complete search history.

(56) References Cited

U.S. PATENT DOCUMENTS

| 5,914,957 | A  | * | 6/1999  | Dean et al. ..................... 370/438 |
| 7,275,155 | B1 |   | 9/2007  | Aull |
| 7,319,759 | B1 | * | 1/2008  | Peinado et al. ............... 380/277 |
| 7,581,096 | B2 |   | 8/2009  | Balfanz et al. |
| 7,983,240 | B2 | * | 7/2011  | Jansson et al. ................ 370/351 |
| 2008/0049942 | A1 |  | 2/2008 | Sprunk et al. |
| 2009/0205028 | A1 |  | 8/2009 | Smeets et al. |
| 2009/0316909 | A1 |  | 12/2009 | Futa et al. |

FOREIGN PATENT DOCUMENTS

| EP | 1249964 | 10/2002 |
| EP | 1253744 | 10/2002 |
| EP | 2056230 | 5/2009 |
| WO | 2006/054843 | 5/2006 |

OTHER PUBLICATIONS

Nemo Semret; Pricing, Provisioning and Peering: Dynamic Markets for Differentiated Internet Services and Implications for Network Interconnections; Dec. 12, 2000; IEEE; pp: 1-15.*
Adams, C., et al., "Internet x.509 Public Key Infrastructure Certificate Management Protocol (CMP)", Network Working Group, Sep. 2005. URL: http://www.iettorg/rfc/rfc4210.txt.

* cited by examiner

*Primary Examiner* — Mohammad W Reza
*Assistant Examiner* — Monjour Rahim

(57) ABSTRACT

One or more servers are provided including a session manager, authentication module, authorization module, encryption module, database, and protocol handler. The session manager is configured to receive requests for new identity data from network-enabled devices. Each request is authenticated first by the update server via its authentication module by validating the signature of the request message as well as the certificate chain trusted by the update server. The authorization module is configured to determine if the network-enabled devices specified on a whitelist are authorized to be provisioned with new identity data. The database is configured to receive new identity records generated by an identity data generation system. Each of the new identity records includes a new identifier. The new identifier is not associated or linked to any previously assigned/used identifiers and identity data, thus all the new identity records are generated independently and then loaded to the update server.

16 Claims, 7 Drawing Sheets

| NEW PKIType ID1 | |
|---|---|
| NEW ID 1 (ID-D1) | NEW PKI DATA 1 |
| NEW ID 2 (ID-D2) | NEW PKI DATA 2 |
| NEW ID 3 (ID-D3) | NEW PKI DATA 3 |

•
•
•

| NEW PKIType IDn | |
|---|---|
| NEW ID 1 (ID-DX) | NEW PKI DATA X |
| NEW ID 2 (ID-DY) | NEW PKI DATA Y |
| NEW ID 2 (ID-DZ) | NEW PKI DATA Z |

FIG. 5

| CustID | NEW PKIType ID 1 | | |
|---|---|---|---|
| PREVIOUS ID 1 (ID-A1) | DEVICE ID 1 (ID-C1) | NEW ID 1 (ID-D1) | NEW PKI DATA 1 |
| PREVIOUS ID 2 (ID-A2) | DEVICE ID 2 (ID-C2) | NEW ID 2 (ID-D2) | NEW PKI DATA 2 |
| PREVIOUS ID 3 (ID-A3) | DEVICE ID 3 (ID-C3) | NEW ID 3 (ID-D3) | NEW PKI DATA 3 |

ID-D IS LINKED TO CERTIFICATE OF THE NEW PKI DATA

• • •

THE SAME ID COULD BE USED FOR DIFFERENT TYPES

| CustID | NEW PKIType ID n | | |
|---|---|---|---|
| PREVIOUS ID 1 (ID-A1) | DEVICE ID 1 (ID-C1) | NEW ID 1 (ID-DX) | NEW PKI DATA X |
| PREVIOUS ID 2 (ID-A2) | DEVICE ID 2 (ID-C2) | NEW ID 2 (ID-DY) | NEW PKI DATA Y |
| PREVIOUS ID 3 (ID-A3) | DEVICE ID 3 (ID-C3) | NEW ID 2 (ID-DZ) | NEW PKI DATA Z |

| FIG. 6A | FIG. 6B |

ONLINE SECURE DEVICE PROVISIONING WITH ONLINE DEVICE BINDING USING WHITELISTS

RELATED APPLICATIONS

This application claims priority from U.S. provisional application Ser. No. 61/390,387, filed Oct. 6, 2010, which is incorporated by reference herein in its entirety.

This application is related to co-pending U.S. application Ser. No. 12/961,455 [BCS06149] filed on Dec. 6, 2010, entitled "Online Public Key Infrastructure (PKI) System." This application is also related to co-pending U.S. application Ser. No. 13/087,847 [BCS06335], filed Apr. 15, 2011, entitled "Online Secure Device Provisioning Framework." This application is also related to co-pending U.S. application Ser. No. 13/087,972 [BCS06330], filed Apr. 15, 2011, entitled "Online Secure Device Provisioning with Updated Offline Identity Data Generation and Offline Device Binding."

BACKGROUND

Digital information has become extremely important in all aspects of commerce, education, government, entertainment and management. In many of these applications, the ability to ensure the privacy, integrity and authenticity of the information is critical. As a result, several digital security mechanisms have been developed to improve security.

One standardized approach to today's digital security is referred to as the Public Key Infrastructure (PKI). PKI provides for use of digital certificates to authenticate the identity of a certificate holder, or to authenticate other information. A certificate authority (CA) issues a certificate to a certificate holder and the holder can then provide the certificate to a third party as an attestation by the CA that the holder who is named in the certificate is in fact the person, entity, machine, email address user, etc., that is set forth in the certificate. And that a public key in the certificate is, in fact, the holder's public key. People, devices, processes or other entities dealing with the certificate holder can rely upon the certificate in accordance with the CA's certification practice statement.

A certificate is typically created by the CA digitally signing, with its own private key, identifying information submitted to the CA along with the public key of the holder who seeks the certificate. A certificate usually has a limited period of validity, and can be revoked earlier in the event of compromise of the corresponding private key of the certificate holder, or other revocable event. Typically, a PKI certificate includes a collection of information to which a digital signature is attached. A CA that a community of certificate users trusts attaches its digital signature and issues the certificates to various users and/or devices within a system.

Network-enabled devices are generally provisioned at the factory with identity data so that they may communicate with other network-enabled devices in a secure manner using an identity data system. The identity data typically includes a public and private key pair and a digital certificate. Illustrative examples of networked-enabled devices include, without limitation, PCs, mobile phones, routers, media players, set-top boxes and the like.

The identity data may be provisioned in network-enabled devices before or after they are deployed in the field. For instance, the identity data may be incorporated into the device at the time of manufacture. For example, a large scale upgrade may occur when a network operator wants to replace their Digital Rights Management (DRM) system or when they want to support other security applications that require the network-enabled devices to be provisioned with new types of identity after the devices have been deployed. This can be a difficult and cumbersome process because it is often performed manually and therefore can require the devices to be returned to a service center.

One particular issue that arises when upgrading or updating identity data concerns the manner in which new identity data is securely delivered to the network-enabled devices.

SUMMARY OF THE INVENTION

In accordance with one aspect of the invention, a method is provided for updating network-enabled devices with new identity data. The method includes receiving requests for new identity data from a plurality of network-enabled devices. The requests include previously assigned identifiers respectively associated with the network-enabled devices. A plurality of new identity records is generated ahead of time by an identity data generation system. The new identity records each include new identity data and new identifiers respectively linked to the new identity data. The method also determines that each of the plurality of network-enabled devices specified in the requests for new identity data are authorized to receive new identity data. A first of the new identity records are retrieved and at least a part of a first of the new identity record is encrypted with a key uniquely associated with a network-enabled device identified by a first of the previously assigned identifiers. The first encrypted new identity record is sent to the network-enabled device identified by the first previously assigned identifier.

In accordance with another aspect of the invention, one or more servers are provided which includes a session manager, an authentication module, an authorization module, a database, and a protocol handler and an encryption module. The session manager is configured to receive requests for new identity data from network-enabled devices. Each request is authenticated first by the update server via its authentication module by validating the signature of the request message as well as the certificate chain trusted by the update server. Each of the requests includes a previously assigned identifiers identifying the respective network-enabled device sending the request. The authorization module is configured to determine if the network-enabled devices specified on a whitelist are authorized to be provisioned with new identity data. The whitelist includes identifier(s) of network-enabled devices previously assigned by a network operator and identifier(s) associated with identity data records previously provisioned in the respective network-enabled devices. The database is configured to receive new identity records generated by an identity data generation system. Each of the new identity records includes a new identifier.

In accordance with one particular aspect of the invention, the new identifier is not associated or linked to any previously assigned/used identifiers and identity data, thus all the new identity records are generated independently and then loaded to the update server. When the server generates response messages for authorized requests, the new identity data records are used sequentially. After a new identify record is used to response to a specific request, the new identifier associated with the new identity record is linked to other previously used identifiers which are part of the request message. Their relationship is then recorded in a database for the tracking and reporting purpose. The protocol handler is configured to deliver a data response message to each of the authorized network-enabled devices requesting new identity data. Each of the data response messages includes a new identity record that is encrypted by the encryption module with a key uniquely associated with the network-enabled device to which the data response message is sent.

BRIEF DESCRIPTION OF THE DRAWINGS

FIG. 5 shows an example of a whitelist after the devices are bound to new PKI data.

DETAILED DESCRIPTION

An identity data management system is described herein which provides a flexible framework that can be used to upgrade, renew, or supplement identity data that is provisioned in a large base of network-enabled devices that have already been deployed in the field. The system architecture allows network operators to install and update the identity data in these devices without having to recall them from the end-user. The system architecture may also allow operators to update expired or expiring digital certificates provisioned in previously deployed network-enabled devices with minimum service disruption. In a common scenario, for instance, a service provider may have acquired, say, 500,000 units of a product that they have delivered to their end user customers. For one reason or another, the service provider may wish to update the identity data in all or a subset (e.g., 100,000) of those units. In one particular instance the identity data is PKI data. In other cases the identity data may take a variety of other forms such as a serial number, a symmetric key that is cryptographic based, and the like. For purposes of illustration only and not as a limitation on the invention the following description will often refer to a PKI management system that is used to upgrade, renew, or supplement PKI data.

It is generally desirable to deliver new identity data to devices in a secure manner. In some cases this is accomplished by encrypting the new identity data with the old identity data provisioned in the device. In this way the device is able to decrypt the new identity data after it has been installed. However, in some cases it may be desirable to protect the new identity data with a key that is specific to a single device and which is installed in the device at the time of manufacture and protected by its hardware (e.g., permanently programmed into a device chip). One example will be presented below in which the new identity data is encrypted with a device specific hardware key, which is referred to herein as a one-time programmable (OTP) key. The OTP key may be stored in a protected digital memory of the device such as a programmable read-only memory (PROM), a field programmable read-only memory (FPROM) or a one-time programmable non-volatile memory (OTP NVM), for example. Another example will also be presented below in which a Diffie-Hellman or other public key based key agreement algorithm is used.

Figures 1, 1A, 1B:
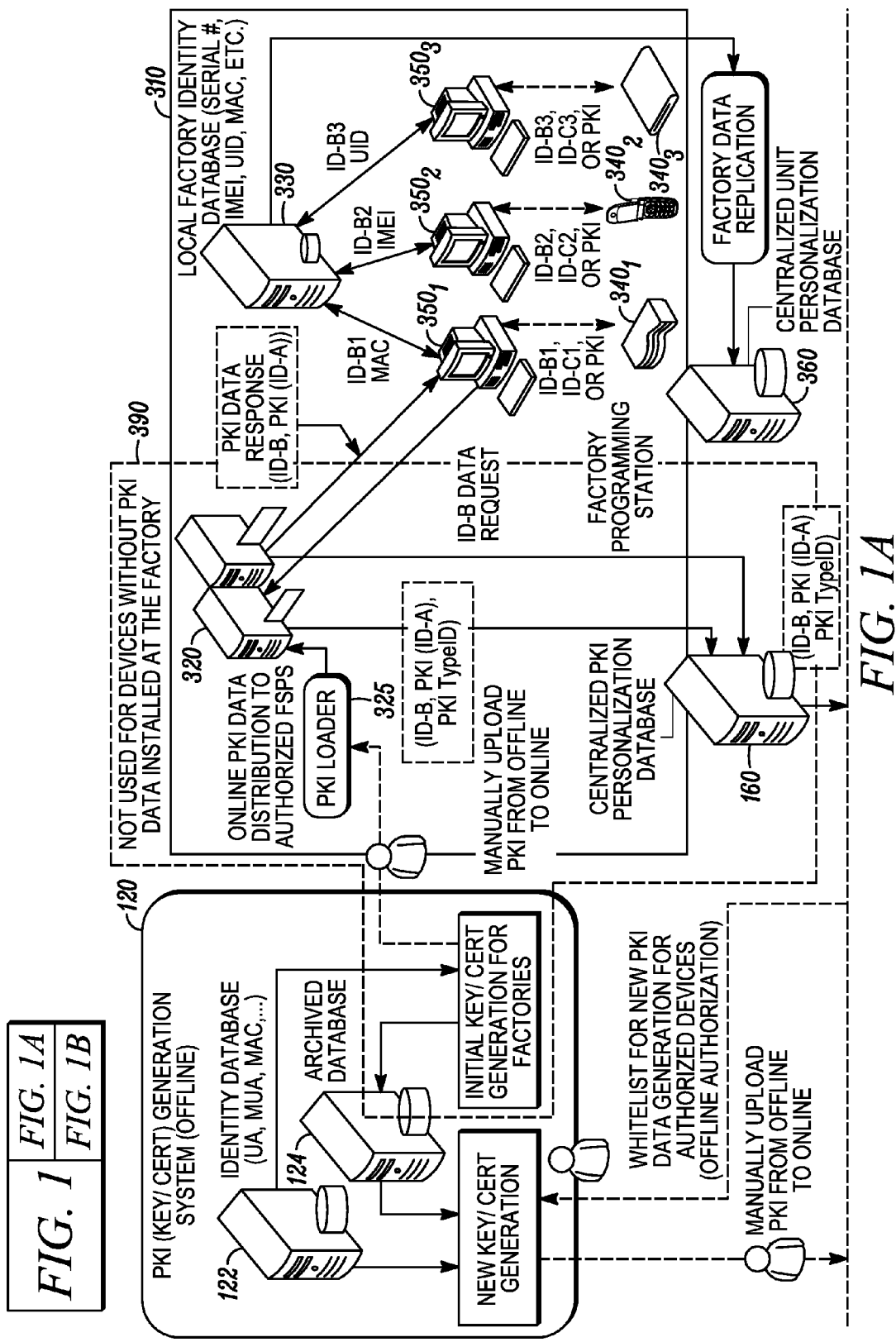
FIGS. 1A and 1B show one example of an operating environment in which the processes described herein for provisioning network-enabled devices with identity data may be implemented.
Figure 1B:
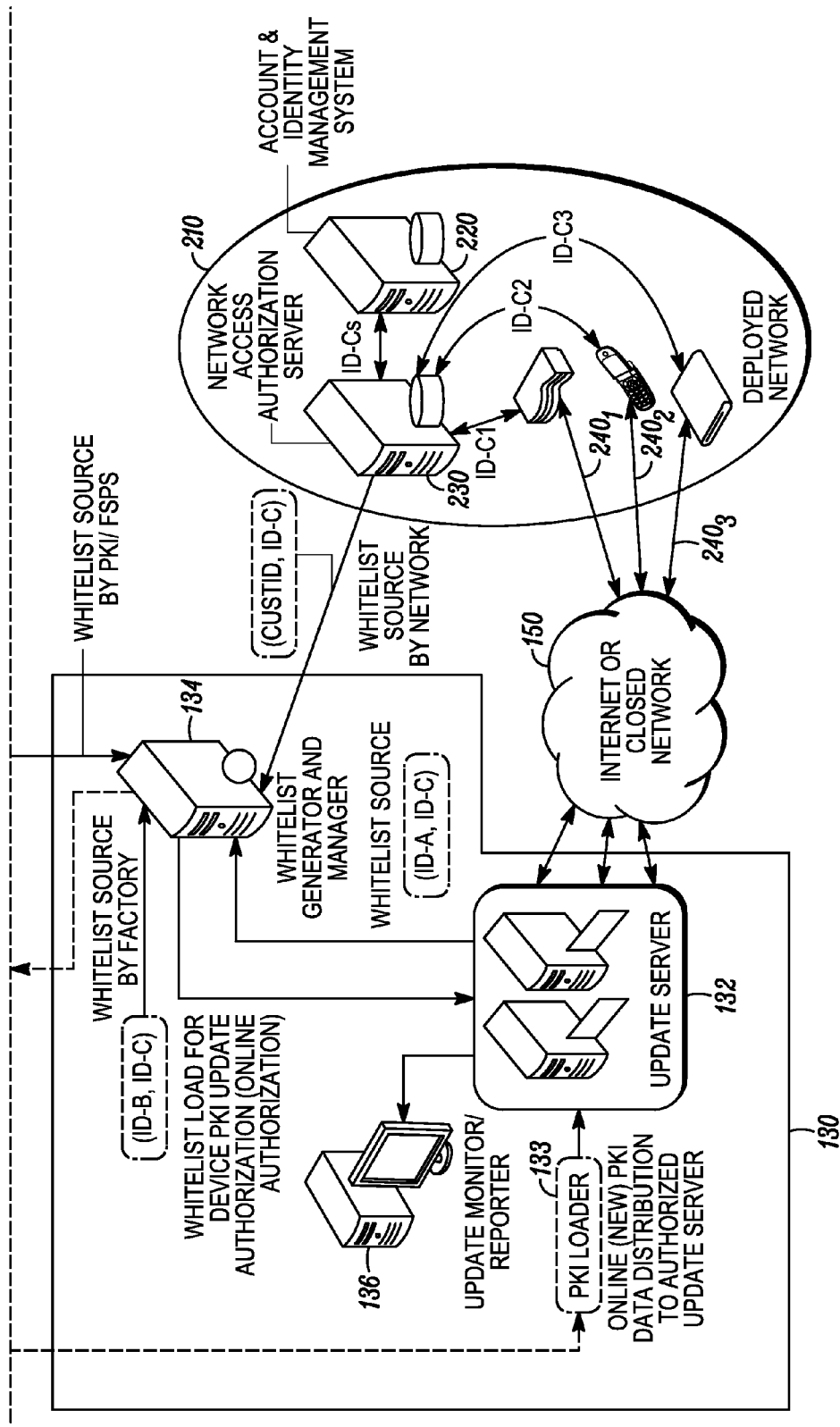

FIGS. 1A and 1B show one example of an operating environment in which the processes described herein for provisioning network-enabled devices with identity data may be implemented. This example shows a number of different domains representative of the different parties that may be involved in the data identity provisioning/update process. In this example three domains are shown: a factory domain 310 representing a manufacturing site for network-enabled devices; a deployed network domain 210 controlled by a network operator that operates the network in which the network-enabled devices are used; and a PKI/identity management system domain 120 operated by a PKI center operator. Although in general these domains may be maintained and operated by the different entities, in some cases they may be operated by the same entities. For instance, the factory domain 310 and the PKI/identity management system domain 120 are sometimes under the control of the same entity.

It should be understood that each domain in FIGS. 1A and 1B is shown in a highly simplified manner in which a single entity (e.g., server, database, etc) may be representative of more complex arrangements and systems. For instance, as explained below, the factory domain includes a factory database 330 which is used to track components used in the manufacturing process, purchase and shipping orders, and so on. In reality, there may be many different systems and entities involved in this process, all of which are represented herein by factory database 330.

The manufacturing domain 310 of a single manufacturer may include multiple manufacturing sites which in some cases can be operated by a third party contract manufacturer distributed world-wide. Each factory, only one of which is illustrated in FIGS. 1A and 1B, may produce a single type or single class of network-enabled devices (e.g., mobile phones) or multiple classes of devices (e.g., mobile phones, routers and set-top boxes). FIGS. 1A and 1B show one illustrative manufacturing site, factory 310, which includes the aforementioned local factory database 330, factory programming stations 350 that allow factory personnel to access the factory database and the network-enabled devices $340_1$, $340_2$, and $340_3$ ("340") being produced, and factory servers 320 that are used to communicate with the PKI system 120 and store the PKI identity data received therefrom.

The network 210 includes a network access authorization server 230, which grants permission to the deployed network-enabled devices $240_1$, $240_2$, and $240_3$ ("240") to access the network and initiate upgrade operations. Identity data and other information concerning the deployed devices 240 are maintained by an account identity and management system 220.

In addition to the identity management components located at the factory site 310 discussed above, the PKI/identity management system includes two primary sub-systems: a PKI/identity generation system 120 and a PKI/identity update system 130. The PKI/identity generation system 120, which for security reasons is often an offline system, includes order fulfillment processors 122, which generate digital certificates or other identity data requested for products. The order fulfillment processors 122 may include, or have access to, hardware security modules (HSMs) in which the CA's certificate signing private keys and secure data may be stored for use by the system. The PKI/identity generation system 120 also includes an archive database 124, which is a database of records. These records may pertain to issued digital certificates, original requests for new digital certificates or secure data, audit data, organization information, product configurations, user information, and other record types as necessary. It should be noted that while the PKI/identity generation system 120 is shown as an offline system, in some implementations it alternatively may be an online system.

The PKI/identity update system 130 includes a PKI/identity update server 132 that receives new identity data from the offline PKI/identity generation system 120 and securely downloads the new identity data to the appropriate deployed network-enabled devices 240. The PKI/identity update system 130 also includes a whitelist generation and manager (WGM) server 134 for consolidating various identifies received from different whitelist sources maintained within the various domains, i.e., the PKI/identity generation domain, the device manufacturer domain and the service provider/network operator domain. In particular, WGM server 134 receives one set of device identifiers from the factory via a unit personalization database 160, which has all the data retrieved from different manufacturing sites and another set of device identifiers, one of which is assigned by the PKI/identity generation system 120, from PKI personalization database 160. Other sources of whitelist data, either from network operators or update servers 132, will be discussed below. These identifiers and other data allow the WGM server 134 to correlate the various identifiers that are assigned to same network-enabled device.

A high-level overview of the secure device provisioning process flow as shown in FIGS. 1A and 1B will be presented. At the outset, it should be noted that different domains may assign its own identifier which are to be associated with the network enabled devices, and these identities need to be tracked and correlated with one another in order to perform a PKI/identity update. In particular, the PKI center coordinator assigns an identifier, referred to herein as ID-A, to each PKI/identity data unit that will ultimately be provisioned in a network-enabled device at the factory. If an identity data unit includes a public-private key pair and a digital certificate, its ID-A will be included in the certificate. Likewise, the manufacturer assigns an identifier, denoted ID-B to each device 340 it manufactures. This identifier will often be in the form of a hardware-based identifier such as a MAC Address, an International Mobile Equipment Identity Number (IMEI) or a unit ID (UID), for example. In addition, the manufacturer may also assign another identifier, denoted ID-C, which may be in the form of a label such as a serial number or the like Unlike the other identifiers, the label will often be visible on the device itself. In part for this reason, the network operator will generally use the identifier ID-C within its own domain. In some cases the identifiers ID-B and ID-C may be the same.

When a network-enabled device is first provisioned with identity data, the PKI/identity generation system 120 generates the initial identity data for each device and delivers it to the factory servers 320. Each identity data unit that is provided to the factory servers 320 includes its identifier ID-A. When the manufacturer is ready to first load a newly manufactured device with identity data, the factory stations 350 will request an identity data record from the factory servers 320 with the device's identifier ID-B. In response, the factory servers 320 will provide the factory stations 350 with an identity data record identified by its identifier ID-A. Both of these identifiers will be stored in the factory servers 320 and replicated to an identity database 160, which associates both identifiers with one another to indicate that they relate to the same network-enabled device 340.

Figures 2, 3:
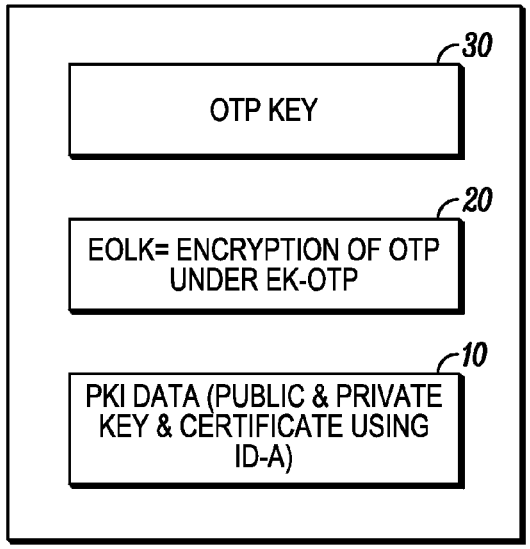
FIG. 2 shows one example of the initial PKI identity data installed into network-enabled devices at the time of manufacture.
FIG. 3 shows an example of new PKI identity data records for three network-enable devices having PKI types ID1 to IDn.

As previously mentioned, in some cases the new identity data is encrypted with a hardware key, referred to as a one-time programmable (OTP) key, which is unique to each device. Since this hardware key is not made available to the identity data update server 132, the initial, factory provisioned identity data is provided with an additional attribute so that the OTP key can be recovered by the update server 132. This additional attribute is an encrypted version of the OTP key, which is referred to herein as an encrypted OTP Link key (EOLK). The OTP key is encrypted by a global key for multiple devices, typically an entire model, product line or the like. The key that is used to decrypt the EOLK is referred to as the EOLK decryption key (DK-EOLK). The DK-EOLK is made available to the identity data update server 132, where it is stored in a hardware security module (HSM) 650. The update server 132 can then use this decryption key to decrypt the OTP keys of all the devices that encrypted using the global key. All the encryption and decryption operations described above may be performed by one or more encryption engines or modules FIG. 2 shows an example of the initial, factory provisioned identity data, which in this case is PKI data 10 and thus includes as attributes the PKI keys and certificates, as well as the EOLK 20. The OPT key 30 is also shown. The manner in which the OTP key, the EOLK and the DK-EOLK are used will be described below.

In another example, instead of using an OTP key the new identity data is encrypted using a Diffie-Hellman or other public key based key agreement algorithm. In the case of the Diffie-Hellman algorithm, the network-enabled devices are pre-provisioned at the factory with a device-specific private key and a device-specific Diffie-Hellman digital certificate which includes a unique public key derived from the device-specific private key. The network-enabled devices are also pre-provisioned with the Diffie-Hellman digital certificate of the update server, which includes the public key of the update server. The network-enabled device can thus perform a Diffie-Hellman key agreement by mathematically combining its public key with the update server's public key to obtain a derived symmetric key. In some implementations the network-enabled devices may be pre-provisioned with the derived symmetric key, and thus does not need to have the private key, the digital certificate of the update server or the capability to perform the Diffie-Hellman key agreement process.

The request sent by the network-enabled device to the identity data update server 132 includes its Diffie-Hellman digital certificate. The update server 132 uses its public key and the network-enabled device's public key contained in the Diffie-Hellman digital certificate to obtain the same derived symmetric key as obtained by the network-enabled device. When the update server 132 sends a new identity data record to the network-enabled device, it encrypts the secret portions of the new record with the derived symmetric key. Since the network-enabled device has the same derived symmetric key as the update server, it is able to decrypt the encrypted record received from the update server 132. The update server only needs to protect its private Diffie-Hellman key, which is stored in the HSM of the update server. The derived symmetric key, which is unique to each device, can be calculated when the update server receives the device's public Diffie-Hellman Key.

When an already deployed device 240 makes a request that requires it to be provisioned with a new identity data unit, the network operator approves the request in accordance with its own internal procedures. In some cases permission to fulfill the request may be granted by the authorization server 230, which may provide a whitelist specifying those devices to be updated to the WGM server 134 associated with the PKI/identity update system 130. Instead of using an authorization server 230 to deliver the whitelist, the network operator may manually deliver the whitelist to the WGM server 134 over an online interface or the like.

Instead of coming from the network operator, in some cases the authorization may come from the factory, particularly when all the devices deployed to a particular network operator are to be upgraded. This authorization may be based, for instance, on a list of all devices shipped to the network operator. The whitelist that is provided includes the identifier used by the network operator, ID-C, for each device that is to be updated. The WGM server 134 obtains the identifiers ID-A and ID-C from a factory where the device was made and from a network operator where the device is deployed, and joins them together into a single whitelist for subsequent distribution to the update server 132 and/or to the PKI/identity generation system 120. If the new identity data to be generated is based on/linked to the identifiers ID-A and/or ID-C, it should be protected by the key/certificate previously provisioned in the devices at the factory. In this case the whitelist is delivered from the WGM server 134 to the PKI/identity generation system 120, from which the previous IDs/keys/certificates can be retrieved to protect the new identity data that is generated. If, on the other hand, the new identity data to be generated is based on a new ID (ID-D) that is not associated with a previously generated/provisioned key/certificate, the PKI/identity generation system 120 generates the new identity data before update requests are received and thus does not need this information from the WGM server 134. In this case, which is discussed in more detail below, the whitelist is directly sent to the update server 132 so that it can be used to check on the device authorization for the update. Next, the devices 240 to be updated each send a request to the update server 132. Among other things, the request includes the EOLK for the device. The request also includes a previously assigned device identifier (e.g., ID-A, and ID-C) which may be a separate parameter in the request message or it may be part of the device's digital certificate which was installed at manufacture time. The request is signed with an asymmetric private key (or other types of keys such as symmetric keys and identifiers) previously installed at the factory. The asymmetric cryptography-based mechanism provides a strong authentication of the request message, while a simple identity and symmetric key based mechanism provides a weaker authentication. The update server 132 first authenticates the device request message by validating its signature and certificate(s). Any invalid request will be rejected.

Using the appropriate identifiers (such as ID-A, and ID-C) for each device 240 requesting an update, the PKI/identity update server 132 can first perform the message authentication check by validating the signature of the request message and its certificates against the trusted certificate chain. The update server then performs the authorization check based on the whitelist it receives to ensure that only authorized devices are updated with the new PKI/identity data. This is done simply by validating whether or not a previously assigned device ID (ID-A or ID-C) in a request message is included in the whitelist. The update server 132 also obtains the new PKI identity data records from the PKI/identity generation system 120. The new PKI identity data records are specified by new identifiers ID-D, which is not based on any of the previous identifiers (ID-A and ID-C). The association of the new and previous PKI/identity data can be determined by the update server when an update request is received.

As previously mentioned, in the example described herein, the new PKI/identity data (IDs and keys) are not related to the previous IDs/keys/certificates. In this case the PKI/identity generation system generates a sufficient pool of new PKI data with internally assigned new identifiers and uploads them to the update server 132 for use. An example of such PKI/identity data records for new identity data types ID1 . . . IDn are shown in FIG. 3.

Each request message received from a device will be fulfilled with the next available new or unused PKI/identity data record stored in the update server 132. In this process, the update server 132 will pair the device ID with a new PKI/identity data record having the identifier ID-D. This online authorization and device binding process is used to ensure that all devices that are authorized to be upgraded will receive the new PKI/identity data.

Prior to sending a new identity data record to a network-enabled device, the update server encrypts at least the portions of the record that are to remain secret using the OTP or other device-specific key such as a Diffie-Hellman derived symmetric key if a Diffie-Hellman algorithm is employed. Therefore the update server needs to calculate the clear OTP key by decrypting the EOLK using either the DK-EOLK or by calculating the shared Diffie-Hellman secret, which is derived from the update server's Diffie-Hellman public key and the network-enabled device's public key. The various encryption and decryption operations may be performed by encryption module 660 of the update server 132

The WGM 134 employs a whitelist-based approach to consolidate the various IDs received and to address any conflict in the process of resolving the above issues. In particular, the WGM 134 manages the various identifiers used by different entities and correlates the different whitelist sources from the factories, the PKI management system and the network operator's access authorization servers as well as the update server 132. This is accomplished by cross indexing the identifiers to create a master database for the subsequent generation of specific whitelists that are tailored for a particular network/customer or application. The WGM 134 also manages the associations among the various IDs and their relationships with their respective PKI/Identity data records which are used for different purposes, including online update request authentication, authorization, new identity protection, and so on. If conflicts arise as a result of information received from either of the three identity data sources or as a result of information stored in update server 132 transaction logs, the WGM 134 detects and resolves them.

The following discussion will from time-to-time refer to PKI data instead of more generally to identity data. However, in all cases any of the other aforementioned types of identity data may be used instead of PKI data. Furthermore, the term "PKI Data" does not necessarily imply the type of identity data which includes digital certificates.

Figure 4:
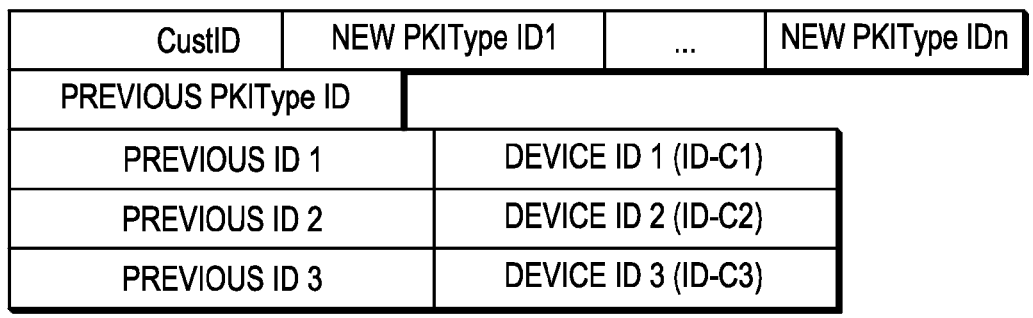
FIG. 4 shows an example of whitelists that may be employed for authorization and device binding are performed during the PKI identity data update process.

FIG. 4 shows one example of a generic whitelist 400 that may be used for both online request message authentication and offline new identity generation with online binding to a specific network-enabled device. The whitelist includes a number of fields that are to be populated by data, including a CustID, New PKI Type ID, Previous PKI Type ID, Previous ID (e.g. ID-A), which is linked to the previous PKI data) and Device ID. The CustID specifies the identifier of the network operator deploying the list of network-enabled devices from which a request for new PKI data is received. The New PKI Type ID (1, . . . , n) specifies the identifier or identifiers for the type and format of the identity data (also known as PKI Data) that is being requested. If the device is to be provisioned for n sets of identity data, then the whitelist may include n New PKI Type IDs. The Previous PKI Type ID specifies the identity data type that is associated with a device's previous PKI data which has previously been installed into a device, most likely in a factory. The Previous ID specifies the original identifier that was assigned to a deployed device by the secure device provisioning system at the factory.

For devices without previously installed PKI data, it is assumed that the device still has some type of a unique identifier (e.g., a chip ID, serial number, MAC Address, etc.) which can be considered to be the Previous ID. In terms of the notation employed above, this identifier is denoted ID-A and is associated with the previous PKI type and data. Note that in the examples presented below PKI identity data is assumed to have been previously installed in the devices being updated. The Device ID (ID-C) specifies the identifier of the device that is used by the network operator to identify a deployed device. A new identifier (ID-D) could be used for new PKI identity generation.

FIG. 5 shows the whitelist after the devices are bound to the new PKI data. As shown, each of the devices 1, 2 and 3 in FIG. 5 are to be provisioned with PKI data records for New PKI Types ID1, ID2, . . . IDn. The new PKI data is denoted with a new identifier, (New ID). Each new identifier is linked to a pair of previously assigned identifiers, which in this example includes ID-A (associated with the old identity data) and ID-C (associated with the service provider). The new identifier may be linked to the PKI data for a single PKI Type or multiple PKI Types. That is, in FIG. 5, the new identifiers ID-D1, ID-D2 and ID-D3 (associated with New PKI Type ID1) may or may not be the same as the identifiers ID-DX, ID-DY and ID-DZ (associated with New PKI Type IDn), respectively.

For devices equipped with an OTP key and which have initial PKI-based identity data that includes its corresponding EOLK installed at the factory, their OTP key can be used for the protection of the new PKI/identity data until it is delivered to the appropriate device. In this way the identity data can be decrypted only by the device that possesses the proper OTP key.

Figures 6, 6A:
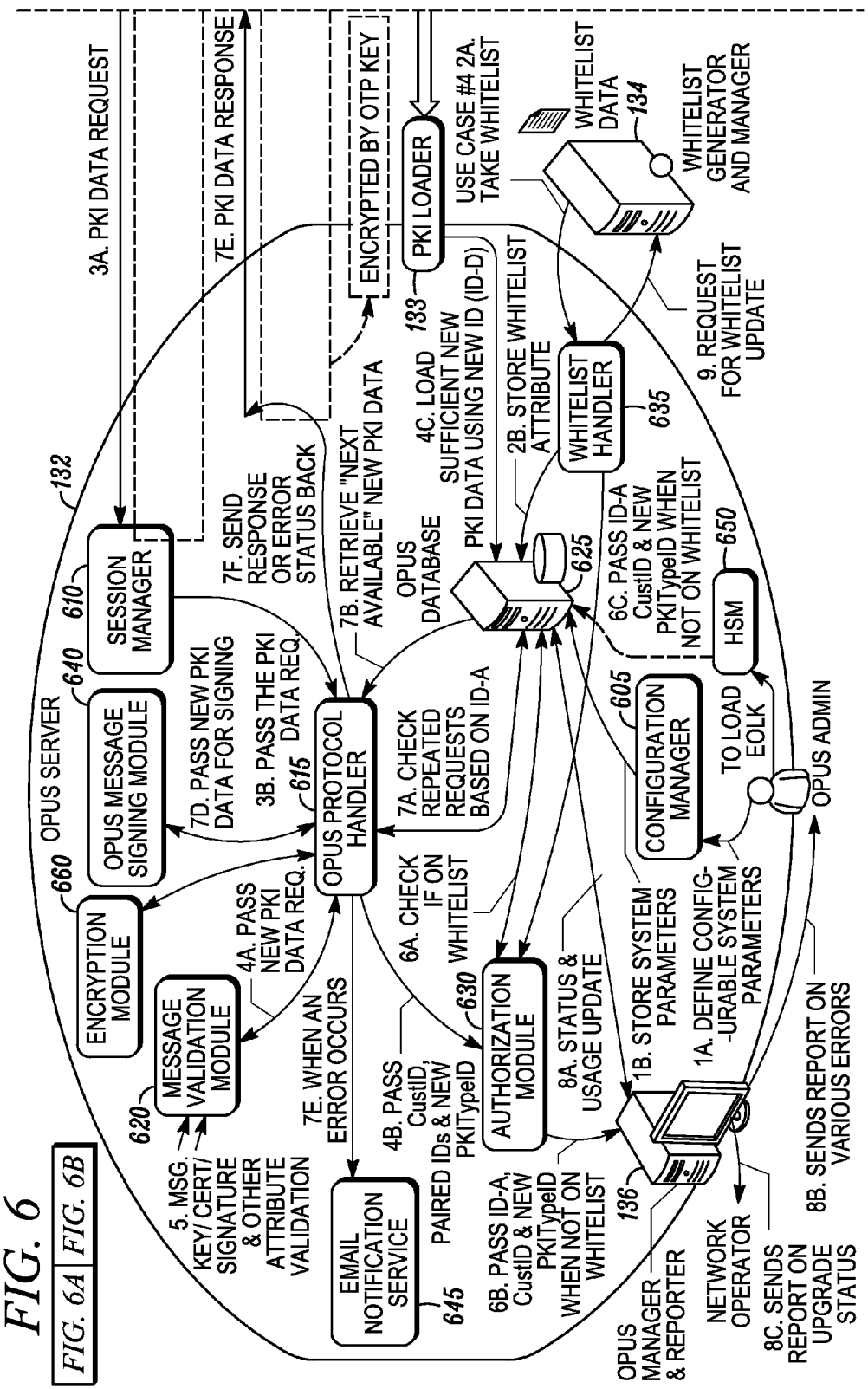
FIG. 6 shows one example of an update server which receives the output from the PKI/identity generation system of FIG. 4 and PKI data requests from the network-enabled devices.
Figure 6B:
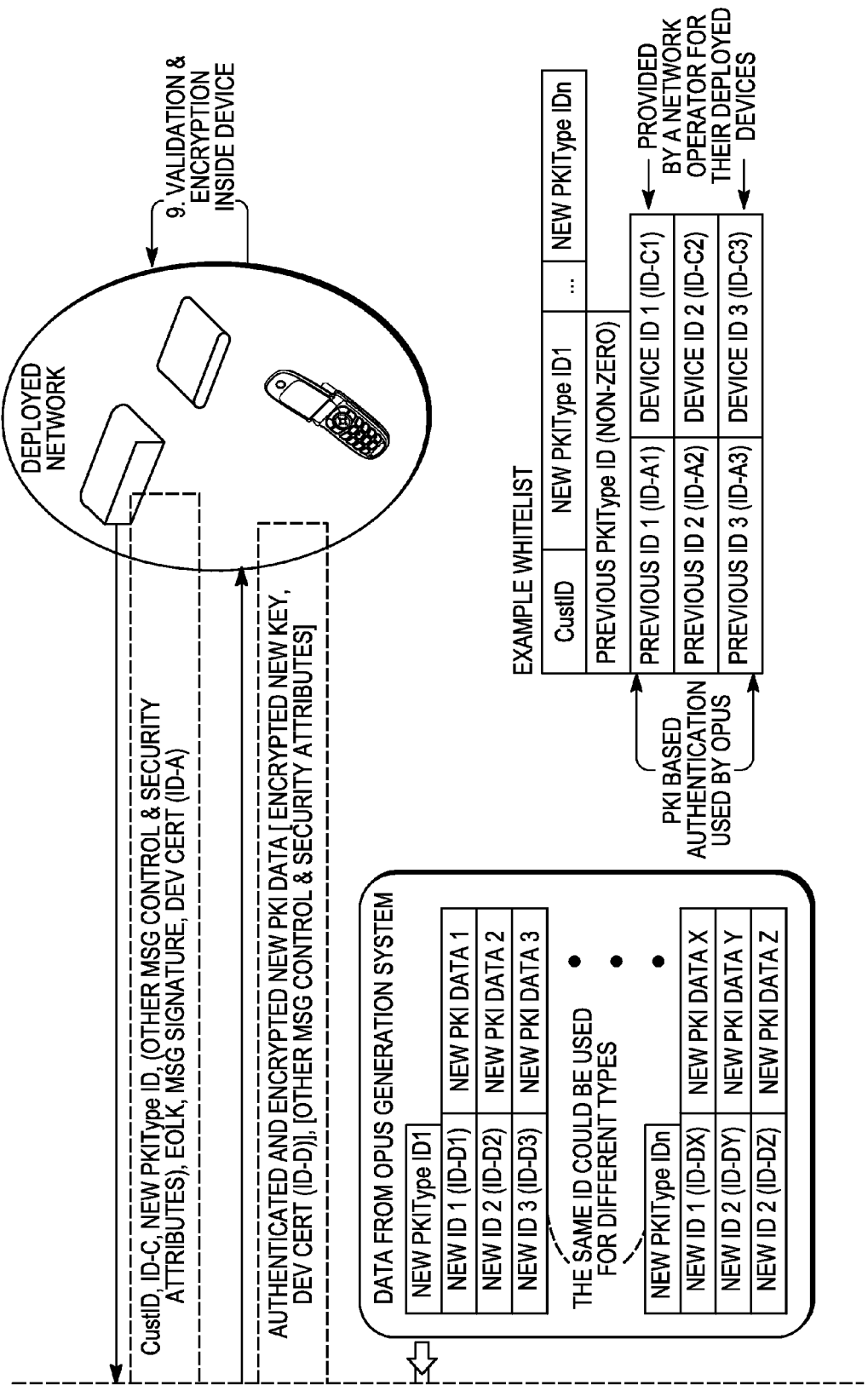

FIG. 6 shows one example of the update server 132 which receives the output from the PKI/identity generation system 120 of FIGS. 1A and 1B and PKI data requests from the network-enabled devices. As previously mentioned, after receiving and validating the request, the update server 132 returns the uniquely protected and authenticated PKI data back to the device. In this example the network-enabled devices are assumed to have been provisioned at the factory with a unique OTP key and an encrypted version of the OTP key. As those of ordinary skill will recognize, a similar process may be performed if other public-based key agreement algorithms are employed.

The process starts at 1 a when a system administrator provides the configuration manager 605 with various system configuration parameters. For instance, one parameter may specify the maximum number of repeat requests allowed from the same device for a specific PKI type and network operator. That is, the number of repeat requests may be different for different network operators and even different types of PKI data for the same network operator. Another parameter may specify the amount of time that must elapse before receiving successive requests from the same device. Yet other parameters may relate to various security checks and the like that are to be performed. The use of these system parameters can allow both efficient preprocessing to maintain server performance while allowing a sufficient number of device retries to account for request failures and/or disruptions. The system administrator also places the EOLK decryption key or keys (the DK-EOLKs) into a hardware security module 650. As previously mentioned, a single decryption key usually will be able to decrypt the EOLK from multiple devices, which will generally belong to an entire product line or the like.

At 1b the system configuration parameters are stored in the server database 625.

The PKI loader 133 imports to the server database 625 at 1c the new identity records that were output from the PKI generation system. The data that is stored is shown in FIG. 3. While the PKI generation system is shown in FIG. 1 as an offline system, as mentioned above, in some implementations it may be an online system. In this latter case, since the identity data generation system is online and the process of binding the identity data to the devices is performed online, both the generation of the identity data and the binding process can be performed by a common system or server (e.g., the update server 132). It should be noted that when the PKI data is imported from an offline system, it generally will be encrypted for security purposes. This layer of encryption is removed when a request for PKI identity data is received, before the identity data is encrypted with the device-specific key described herein.

The WGM 134 provides a whitelist such as shown in FIG. 2 to the whitelist handler 635, which in turn parses the data and stores the whitelist attributes in server database 625 at 2b.

At 3a, the session manager 610 receives a PKI data request from a specific device. The request includes data such as the CustID, the previously assigned device identifier (ID-A or ID-B or ID-C), the device EOLK, the device certificate and a signature. The request is passed to the protocol handler 615 at 3b. The protocol handler 615, in turn, passes the new PKI data request to the message validation module 620 at 4a. In addition, the protocol handler 615 also passes at 4b the aforementioned ID pairing information, the new PKI Type ID and CustID to the authorization module 630.

At 5, the message validation module 620 checks the format of the PKI data request, verifies the signature, validates the key and certificate chain, and checks that the message conforms to various message protocols to determine, for example, that the message has a proper timestamp and/or sequence number.

The authorization module 630 determines at 6a if the requesting device is authorized for an upgrade for the particular new PKI type that is being requested. Such verification of the device's authorization to receive an upgrade can be accomplished by confirming that the paired IDs (ID-A and ID-C) in an upgrade request is on the whitelist provided to the server database 625. If the authorization verification fails, the authorization module 630 at 6b passes the missing ID pairing information along with the CustID and the new identity data type to the monitor and reporter 136 so that the network operator may be notified. This notification indicates that although the request for new PKI data which was received from the device may be valid, the necessary information needed to perform the upgrade was not made available to the update server 132. In addition, this same information is passed to the whitelist handler 635 at 6c, which as discussed below, can request the WGM 134 to perform whatever steps are necessary to provide the update server 130 with the missing information.

The protocol handler 615 next checks with the server database 625 at 7a to see if the number of repeated requests from the same device is less than the maximum allowed amount. The purpose of this check is to ensure that the update server 132 can stop responding to a rogue device that repeatedly sends new PKI data requests to the server. If the maximum number of requests has not been exceeded, at 7b the next available new PKI data record is retrieved from the database 625 based on the new PKI Type ID. At 7c the protocol handler 615 then uses the encryption module 660 to decrypt the EOLK that it received along with the identity data request received at step 3b by using the decryption key (DK-EOLK) stored in the HSM 650. Note that, as previously mentioned, if the PKI identity data was provided by an offline generation system, the data will generally have been encrypted. This encryption layer needs to be removed before the EOLK can be decrypted. In this way the encryption module 650 recovers the OTP key for the device. The new PKI data record is then encrypted (or re-encrypted if the identity data was encrypted upon receipt from an offline generation system) by the protocol handler 615 using the OTP key. If the Diffie-Hellman algorithm is used, the encryption key is computed from the server's Diffie-Hellman private key and the device's Diffie-Hellman public key (obtained the device's Diffie-Hellman certificate) using a Diffie-Hellman key agreement process. The new PKI Data is then encrypted using this encryption key. Note that only the secret key and any private attributes of the new PKI data need to be encrypted.

The new encrypted PKI data record is incorporated into a new PKI data response message, which at 7d is sent to the message signing module 640 so that it can be signed with the private key of the update server 132. If an error occurs in this process, at 7e the protocol handler 615 sends a status error message to the email notification module 645. In some cases the protocol handler may also send an error message to the device since the device may have some error handling capabilities. Assuming no error has occurred, the signed new PKI data response message is sent to the device at 7f.

The monitor and reporter 136 retrieves at 8a various usage data and status information from the server database 625 as well as transaction and error logs. Examples of the usage data are the number of new PKI data records loaded and requested, the identification of records that are requested more than once or requested for the maximum allowed number of times, and so on. The monitor and reporter 136 sends this information at 8b to the system administrator, indicating any errors that have occurred. At 8c, the monitor and reporter 136 also sends periodic reports to the network operator so that they are informed of the upgrade status. Finally, the whitelist handler 635 at 9 sends a message back to the WGM 134 requesting any whitelist updates.

As used in this application, the terms "component," "module," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications may be made to this configuration without departing from the scope or spirit of the claimed subject matter.

The invention claimed is:

1. A method for updating network-enabled devices with new identity data, comprising:
   receiving requests for new identity data from a plurality of network-enabled devices, said requests including previously assigned identifiers respectively associated with the network-enabled devices and encrypted versions of keys uniquely associated with the network-enabled devices;
   decrypting the encrypted versions of the keys;
   receiving a plurality of new identity records that each include new identity data and new identifiers respectively linked to the new identity data;
   receiving a whitelist of network-enabled devices authorized to be provisioned with new identity data;
   determining that each of the plurality of network-enabled devices specified in the requests for new identity data are authorized to receive new identity data by confirming that the previously assigned identifiers included in the requests are also included in the whitelist;
   retrieving a first of the new identity records;
   encrypting at least a part of a first of the new identity record with a key uniquely associated with a network-enabled device identified by a first of the previously assigned identifiers; and
   sending the first encrypted new identity record to the network-enabled device identified by the first previously assigned identifier.

2. The method of claim 1 in which a decryption key used to decrypt the encrypted version of the key is able to decrypt encrypted keys included in requests received from a plurality of network-enabled devices requesting new identity data.

3. The method of claim 1 wherein the keys uniquely associated with the respective network-enabled devices sending the requests are one-time programmable keys stored in a protected memory included in the network-enabled devices.

4. The method of claim 1 wherein the requests for new identity data each include a public key uniquely associated with a respective one of the network-enabled devices, and further comprising executing a public key based agreement algorithm using the public key to obtain the key uniquely assigned to each respective network-enabled device which is used to decrypt the new identity data records respectively delivered to the network-enabled devices.

5. The method of claim 1 further comprising validating the request by at least verifying a signature of the request.

6. The method of claim 1 wherein, if determining that each of the plurality of network-enabled devices specified in the request for new identity data are authorized to receive the new identity data fails, sending a message requesting any information concerning missing pairs of previously assigned identifiers.

7. The method of claim 1 further comprising determining that a number of requests for new identity data is not received from a given network-enabled devices more than a maximum allowed number of times.

8. The method of claim 1 wherein the new identity data is not linked to old identity data previously provisioned in the network-enabled devices and wherein retrieving the first of the new identity records includes retrieving a next available new identity record independent of the network-enabled device to which the first identity data record is to be sent.

9. The method of claim 1 wherein retrieving, encrypting and sending are performed online upon receiving the request.

10. At least one server, comprising:
- a session manager configured to receive requests for new identity data from network-enabled devices, each of said requests including a previously assigned identifier identifying the respective network-enabled device and an encrypted version of a key uniquely associated with the network-enabled device;
- an authorization module configured to determine if the network-enabled devices specified on a whitelist are authorized to be provisioned with new identity data, the whitelist including previously assigned identifiers of network-enabled devices associated with identity data records previously provisioned in the respective network-enabled devices;
- a database configured to receive new identity records generated by an identity data generation system, wherein each of the new identity records includes a new identifier; and
- a protocol handler configured to decrypt the encrypted version of the key and deliver a data response message to each of the authorized network-enabled devices requesting new identity data, each of the data response messages including a new identity record that is encrypted with a key uniquely associated with the network-enabled device to which the data response message is sent.

11. The at least one server of claim 10 in which the decryption key is able to decrypt encrypted keys included in requests received from a plurality of network-enabled devices requesting new identity data.

12. The at least one server of claim 10 wherein the keys uniquely associated with the respective network-enabled devices sending the requests are one-time programmable keys stored in a memory included in the network-enabled devices.

13. The at least one server of claim 10 wherein the requests for new identity data each include a public key uniquely associated with a respective one of the network-enabled devices, said protocol handler being further configured to execute a public key based agreement algorithm using the public key to obtain the key uniquely assigned to each respective network-enabled device which is used to encrypt the new identity data records respectively delivered to the network-enabled devices.

14. The at least one server of claim 10, further comprising a configuration manager for receiving user input specifying a maximum number of repeat requests that are allowed from a particular network-enabled device.

15. The at least one server of claim 10, wherein the authorization module is configured to determine if the network-enabled devices specified on the whitelist are authorized to be provisioned with new identity data by determining if pairing information included in the request is also in the database.

16. One or more non-transitory computer-readable storage media containing instructions which, when executed by one or more processors perform a method for updating network-enabled devices with new identity data, comprising:
- receiving requests for new identity data from a plurality of network-enabled devices, said requests including previously assigned identifiers respectively associated with the network-enabled devices and encrypted versions of keys uniquely associated with the network-enabled devices;
- decrypting the encrypted versions of the keys;
- receiving a whitelist of network-enabled devices authorized to be provisioned with new identity data
- determining that each of the plurality of network-enabled devices specified in the requests for new identity data are authorized to receive new identity data by confirming that the previously assigned identifiers included in the requests are also included in the whitelist;
- binding new identity data to each of the network-enabled devices authorized to receive new identity data;
- encrypting the new identity data bound to each of the network-enabled devices using an encryption key unique to each respective network-enabled device; and
- sending the first encrypted new identity record to the network-enabled device identified by the first previously assigned identifier.

* * * * *